(12) United States Patent
Sakaguchi et al.

(10) Patent No.: US 11,505,221 B2
(45) Date of Patent: Nov. 22, 2022

(54) FLOATING CALIPER BRAKE DEVICE FOR RAILROAD VEHICLE

(71) Applicants: NIPPON STEEL CORPORATION, Tokyo (JP); CENTRAL JAPAN RAILWAY COMPANY, Nagoya (JP)

(72) Inventors: Kousuke Sakaguchi, Tokyo (JP); Kazuaki Fujita, Tokyo (JP); Masanori Sawada, Tokyo (JP); Hironori Yokota, Tokyo (JP); Tomohiro Otsuka, Nagoya (JP); Jun Asano, Nagoya (JP); Masashi Sekiya, Nagoya (JP); Seiji Kanamori, Nagoya (JP)

(73) Assignees: NIPPON STEEL CORPORATION, Tokyo (JP); CENTRAL JAPAN RAILWAY COMPANY, Nagoya (JP)

( * ) Notice: Subject to any disclaimer, the term of this patent is extended or adjusted under 35 U.S.C. 154(b) by 105 days.

(21) Appl. No.: 16/616,016

(22) PCT Filed: May 22, 2018

(86) PCT No.: PCT/JP2018/019723
§ 371 (c)(1),
(2) Date: Nov. 22, 2019

(87) PCT Pub. No.: WO2018/216704
PCT Pub. Date: Nov. 29, 2018

(65) Prior Publication Data
US 2020/0086897 A1 Mar. 19, 2020

(30) Foreign Application Priority Data
May 23, 2017 (JP) .............................. JP2017-101772

(51) Int. Cl.
*F16D 65/18* (2006.01)
*B61H 5/00* (2006.01)
*F16D 55/2265* (2006.01)
*F16D 127/02* (2012.01)

(52) U.S. Cl.
CPC .......... *B61H 5/00* (2013.01); *F16D 55/2265* (2013.01); *F16D 2127/02* (2013.01)

(58) Field of Classification Search
CPC ..... B61H 15/0021; F16D 65/52; F16D 65/54; F16D 65/62; F16D 65/64;
(Continued)

(56) References Cited

U.S. PATENT DOCUMENTS 860,249 A * 7/1907 Sauvage ............ B61H 15/0021
188/199
867,672 A * 10/1907 Parker-Smith ..... B61H 15/0021
188/199
(Continued)

FOREIGN PATENT DOCUMENTS

CN 103362990 A 10/2013
EP 1950448 A1 * 7/2008 ............. F16D 65/28
(Continued)

OTHER PUBLICATIONS

International Preliminary Report on Patentability and Written Opinion of the International Searching Authority (forms PCT/IB/373, PCT/ISA/237 and PCT/IB/326), dated Dec. 5, 2019, for corresponding International Application No. PCT/JP2018/019723, with a Written Opinion translation.
(Continued)

*Primary Examiner* — Bradley T King
*Assistant Examiner* — Stephen M Bowes
(74) *Attorney, Agent, or Firm* — Birch, Stewart, Kolasch & Birch, LLP (57) ABSTRACT

A floating caliper brake device for a railroad vehicle includes: a support pin that is supported by a cylindrical portion of a support frame in such a manner as to be slidable in a direction X; a caliper; a first and second brake shoe; a pressurizing device that moves the first brake shoe back and
(Continued)

forth; an elastic member that is expandable and contractible in the direction X; a stopper member that is immovable relatively to the cylindrical portion in the direction X; and a moving member that is frictionally engaged with the support pin so as to be slidable in the direction X.

4 Claims, 5 Drawing Sheets

(58) Field of Classification Search
CPC ............. F16D 55/22655; F16D 55/226; F16D 55/2265; F16D 65/0087; F16D 2127/02
See application file for complete search history.

(56) References Cited

U.S. PATENT DOCUMENTS

| | | | | |
|---|---|---|---|---|
| 3,791,491 A | * | 2/1974 | Tickle | B61H 11/14 188/70 R |
| 4,382,491 A | * | 5/1983 | Chun | F16D 55/22655 188/196 P |
| 5,465,816 A | * | 11/1995 | Moore | B61H 15/00 188/196 P |
| 5,601,163 A | | 2/1997 | Kent | |
| 9,512,892 B2 | * | 12/2016 | Burgoon | F16D 65/54 |
| 2013/0256077 A1 | | 10/2013 | More | |

FOREIGN PATENT DOCUMENTS

| | | |
|---|---|---|
| FR | 2605155 A1 | 4/1988 |
| JP | 6-32773 U | 4/1994 |
| JP | 2016-89979 A | 5/2016 |
| JP | 2017-172731 A | 9/2017 |
| WO | WO 03/081073 A1 | 10/2003 |

OTHER PUBLICATIONS

International Search Report (form PCT/ISA/210), dated Jul. 17, 2018, for corresponding International Application No. PCT/JP2018/019723, with an English translation.

* cited by examiner

CONVENTIONAL ART

FLOATING CALIPER BRAKE DEVICE FOR RAILROAD VEHICLE

TECHNICAL FIELD

The present invention relates to a floating caliper brake device for a railroad vehicle.

BACKGROUND ART

Figure 5:
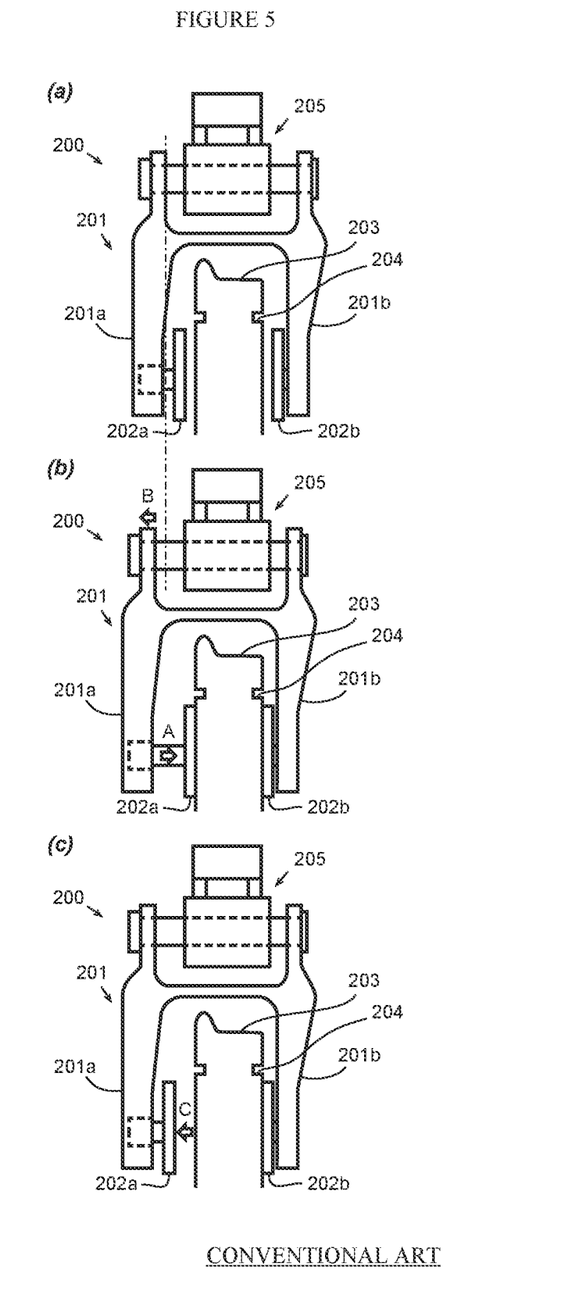
FIG. 5 is a schematic diagram illustrating a conventional floating caliper brake device.

FIG. 5 is a schematic diagram illustrating a conventional floating caliper brake device 200. The floating caliper brake device 200 is a device that presses brake shoes 202a and 202b provided on paired arm parts 201a and 201b bifurcately formed at an end of a caliper 201, against a rotor 204 provided on a railroad wheel 203, so as to apply a brake on the rotating wheel 203.

The caliper 201 is supported in such a manner as to be movable with respect to a support frame 205 installed on a railroad bogie. Specifically, in braking, when the brake shoe 202a, which is one of the brake shoes, is moved in a direction A illustrated in FIG. 5(b) to be pressed against the rotor 204, a resultant reaction force causes the caliper 201 to move in a direction B, and the brake shoe 202b, which is the other one of the brake shoes, is pressed against the rotor 204.

However, even when the braking is released and the one brake shoe 202a is moved in a direction C to be separated from the rotor 204 as illustrated in FIG. 5(c), the other brake shoe 202b still remains in contact with rotor 204 to be dragged. This results in a problem in that only the other brake shoe 202b wears unnecessarily. Hence, there is a need for a mechanism that returns a position of the caliper 201 to a state illustrated in FIG. 5(a) after the braking is released.

For example, Patent Document 1 discloses a floating caliper brake device that is free from the dragging phenomenon. In addition, Patent Document 2 discloses a floating caliper brake device that stably makes a caliper retracting operation to reliably prevent a pad from being dragged.

LIST OF PRIOR ART DOCUMENTS

Patent Document

Patent Document 1: JP6-32773U
Patent Document 2: JP2016-89979A

SUMMARY OF INVENTION

Technical Problem

However, the caliper retracting mechanisms disclosed in Patent Documents 1 and 2 each utilize a restoring force of a rubber ring having an H-shape or U-shape cross section. Elastic force of a rubber ring changes in their use, which raises a problem in that it is difficult to adjust an amount of the restoration.

The present invention has an objective to provide a floating caliper brake device for a railroad vehicle for which the above problem is solved and in which gaps between brake shoes and a rotor are adjusted to prevent the brake shoes from being dragged.

Solution to Problem

The present invention is made to solve the problem described above, and the gist of the present invention is a floating caliper brake device for a railroad vehicle described below.

(1) A floating caliper brake device for a railroad vehicle, including a support frame that includes a cylindrical portion and is installed on a railroad bogie;

a support pin that is supported by the cylindrical portion in such a manner as to be slidable in an axial direction of the cylindrical portion;

a caliper that is fixed to the support pin, extends in a direction intersecting with the axial direction, and includes a first arm portion provided on a first side in the axial direction and a second arm portion provided on a second side in the axial direction;

a first brake shoe that is provided on the first arm portion;

a second brake shoe that is provided on the second arm portion and is opposite to the first brake shoe in the axial direction;

a pressurizing device configured to move the first brake shoe back and forth with respect to the second brake shoe;

an elastic member that is supported by the cylindrical portion and is expandable and contractible in the axial direction;

a stopper member that is supported by the cylindrical portion in such a manner as to be immovable relatively to the cylindrical portion in the axial direction; and a moving member that is frictionally engaged with the support pin on the second side from the elastic member so as to be slidable in the axial direction, wherein an end portion of the elastic member on the first side and an end portion of the stopper member on the first side are each supported by the cylindrical portion, at least a portion of an end portion of the stopper member on the second side overlaps the moving member when viewed in the axial direction, and an end portion of the elastic member on the second side projects toward the second side from the end portion of the stopper member on the second side and is connected to the moving member.

(2) The floating caliper brake device for a railroad vehicle according to the above (1), wherein the moving member is frictionally engaged with the support pin in such a manner that a maximum static friction occurring between the support pin and the moving member is greater than a restoring force of the elastic member.

(3) The floating caliper brake device for a railroad vehicle according to the above (1) or (2), further including a restriction member configured to restrict a distance between the end portion on the first side of the elastic member and the end portion on the first side of the moving member to not more than a predetermined value.

Advantageous Effects of Invention

According to the present invention, an amount of restoration for the caliper is adjustable, and thus gaps between the brake shoes and a rotor can be adjusted, so that the brake shoes can be prevented from being dragged.

DESCRIPTION OF EMBODIMENTS

Floating caliper brake devices for a railroad vehicle according to embodiments of the present invention will be described below with reference to the drawings.

Figure 1:
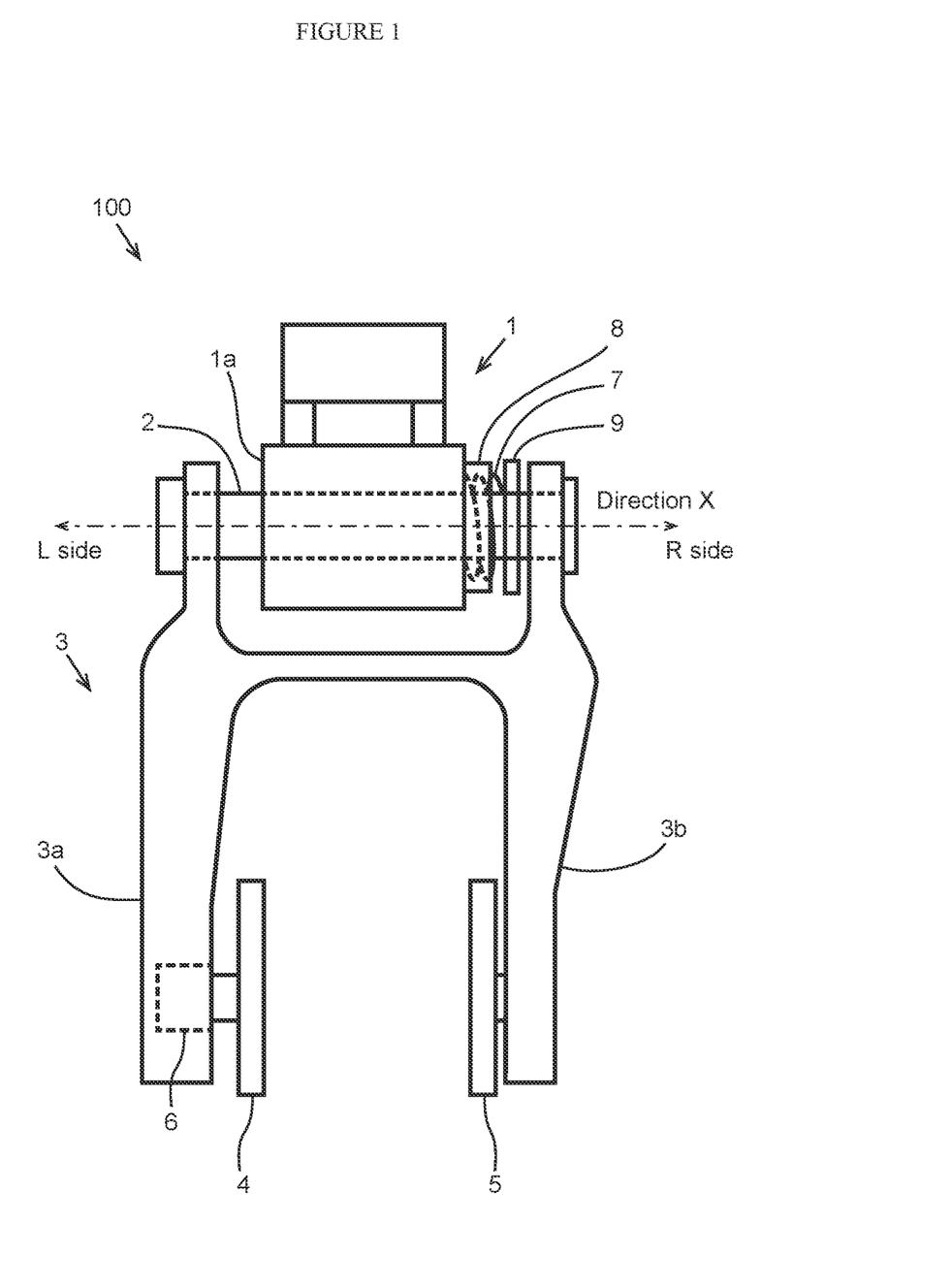
FIG. 1 is a schematic diagram illustrating a configuration of a floating caliper brake device according to an embodiment of the present invention.

FIG. 1 is a schematic diagram illustrating a configuration of a floating caliper brake device 100 for a railroad vehicle according to an embodiment of the present invention (hereinafter, referred to also as a "floating caliper brake device 100").

As illustrated in FIG. 1, the floating caliper brake device 100 includes a support frame 1, a support pin 2, a caliper 3, a first brake shoe 4, a second brake shoe 5, a pressurizing device 6, an elastic member 7, a stopper member 8, and a moving member 9.

The support frame 1 is a member that is installed on a railroad bogie and has a cylindrical portion 1a. The support pin 2 is supported in the cylindrical portion 1a in such a manner as to be slidable in an axial direction of the cylindrical portion 1a (hereinafter, referred to also as a "direction X"). The caliper 3 includes a first arm portion 3a and a second arm portion 3b. In the present embodiment, one of the arm portions that is provided on a first side (the L side in FIG. 1) is referred to as the first arm portion 3a, and the other of the arm portions that is provided on the second side (the R side in FIG. 1) is referred to as the second arm portion 3b. The first arm portion 3a and the second arm portion 3b both extend in a direction intersecting with the direction X.

The first brake shoe 4 and the second brake shoe 5 are provided on the first arm portion 3a and the second arm portion 3b, respectively, and face toward each other in the direction X. In a state where the floating caliper brake device 100 is installed on a railroad bogie, a rotor not illustrated is interposed between the first brake shoe 4 and the second brake shoe 5, and thus the first brake shoe 4 and the second brake shoe 5 face outside surfaces of the rotor.

The pressurizing device 6 is a device that moves the first brake shoe 4 back and forth with respect to the second brake shoe 5. There is no limitation to the mechanism for moving the first brake shoe 4 back and forth, and a hydraulic cylinder, a pneumatic cylinder, an electric motor, or the like can be used for the mechanism.

Figure 2:
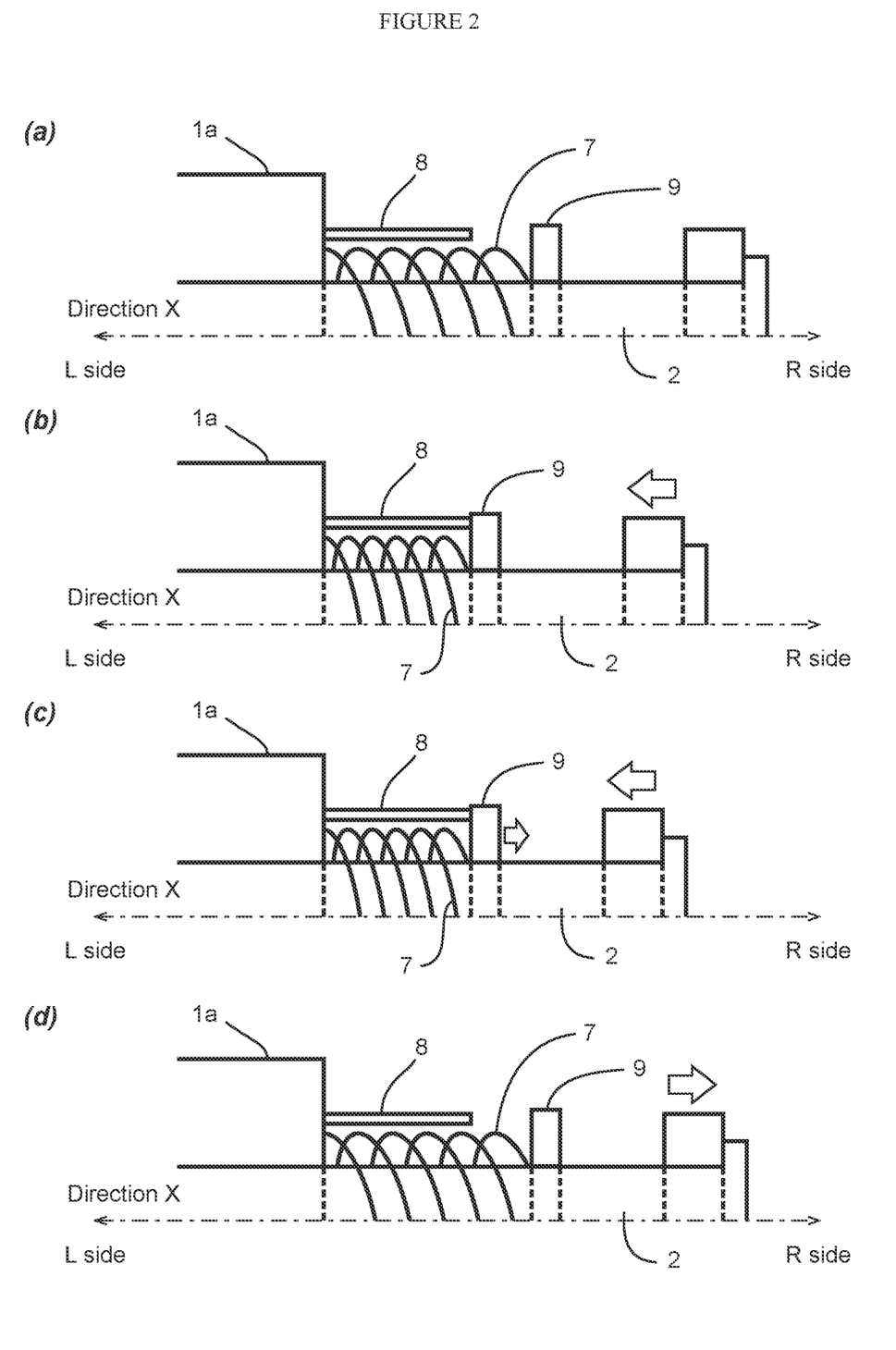
FIG. 2 is a schematic diagram illustrating the floating caliper brake device according to an embodiment of the present invention, where an elastic member, a stopper member, and a moving member, and their surroundings are enlarged.

FIG. 2 is a schematic diagram illustrating the floating caliper brake device 100 according to an embodiment of the present invention, where the elastic member 7, the stopper member 8, and the moving member 9, and their surroundings are enlarged. The elastic member 7 is a member that is supported by the cylindrical portion 1a and expandable and contractible in the direction X. In the configuration illustrated in FIG. 2, a coiled spring is used as the elastic member 7.

The stopper member 8 is supported by the cylindrical portion 1a in such a manner to be immovable relatively to the cylindrical portion 1a in the direction X. More specifically, an end portion of the stopper member 8 on the L side is supported by the cylindrical portion 1a, and the stopper member 8 has a cross-sectional shape that extends toward the R side in such a manner as not to touch the elastic member 7. In addition, as illustrated in FIG. 2(a), in non-braking, an end portion of the elastic member 7 on the R side projects toward the R side from the end portion of the stopper member 8 on the R side.

The moving member 9 is frictionally engaged with the support pin 2 at a position on the R side from the elastic member 7 in such a manner as to be slidable in the direction X. Therefore, in the elastic member 7, its end portion on the L side is supported by the cylindrical portion 1a, and its end portion on the R side is connected to the moving member 9. In addition, the moving member 9 and at least a portion of the end portion of the stopper member 8 on the R side are positioned in such a manner as to overlap when viewed in the direction X.

How the elastic member 7, the stopper member 8, and the moving member 9 operate in braking will be described in more detail with reference to FIG. 2.

In an initial stage of non-braking, a positional relationship between the elastic member 7, the stopper member 8, and the moving member 9 is in a state illustrated in FIG. 2(a). The elastic member 7 is in a state where the elastic member 7 is contracted from its free length by a certain amount, and a restoring force caused by the contraction is less than a maximum static friction occurring between the cylindrical portion 1a and the support pin 2 and than a maximum static friction between the support pin 2 and the moving member 9. Therefore, each of the members is kept stationary.

In braking, as mentioned above, a reaction force caused by the first brake shoe 4 being pressed against the rotor causes the caliper 3 and the support pin 2 to move toward the L side, and thus the second brake shoe 5 is pressed against the rotor (see FIG. 5(b)). As a result, the moving member 9 moves together with the support pin 2 toward the L side by a predetermined amount with respect to the cylindrical portion 1a, which brings about a state illustrated in FIG. 2(b). At that time, an adjustment is made such that an amount of the movement of the support pin 2 in the braking becomes the same as an amount of the projection of the elastic member 7 from the stopper member 8 in the initial stage of non-braking, so that the movement of the support pin 2 stops at a position where the stopper member 8 comes into contact with the moving member 9, as illustrated in FIG. 2(b).

When the braking is released, a restoring force of the elastic member 7 applies a force toward the R side to the moving member 9, causing the support pin 2 to move together with the moving member 9 toward the R side. That is, the restoring force of the elastic member 7 in braking (the state illustrated in FIG. 2(b)) is greater than a maximum static friction occurring between the cylindrical portion 1a and the support pin 2 and less than a maximum static friction occurring between the support pin 2 and the moving member 9. When equilibrium is then reached between the restoring force of the elastic member 7 and a kinetic friction force occurring between the cylindrical portion 1a and the support pin 2, the movement of the support pin 2 and the moving member 9 toward the R side stops. By making an adjustment such that this state is set as an initial state (the state of FIG. 2(a)), operation of braking and releasing causes reiteration of the state of FIG. 2(a) and the state of FIG. 2(b).

With the above mechanism, the amount of the restoration can be kept constant, and thus the brake shoes can be prevented reliably from being dragged.

Here, the amount of the movement of the support pin 2 in the braking depends on distances between the two brake shoes and the rotor. With use, the brake shoes wear by friction with the rotor, and thus the distances between the brake shoes and the rotor gradually increase every time the abrasion occurs. As a result, a total amount of movement of the support pin 2 in the braking becomes long as compared with its initial state. That is, a position of the support pin 2 at a time of the braking moves toward the L side from the state of FIG. 2(b).

Although the moving member 9 is frictionally engaged with the support pin 2, an end portion of the moving member 9 on the L side abuts against the end portion of the stopper member 8 on the R side in the state of FIG. 2(b), and thus the moving member 9 cannot move together with the support pin 2 toward the L side. As a result, the moving member 9 is to slide toward the R side relatively to the support pin 2, which brings about the state illustrated in FIG. 2(c).

When the braking is thereafter released, the restoring force of the elastic member 7 applies the force toward the R side to the moving member 9, causing the support pin 2 to move together with the moving member 9 toward the R side. In a state where the equilibrium is then reached between the restoring force of the elastic member 7 and the kinetic friction force occurring between the cylindrical portion 1a and the support pin 2 (a state illustrated in FIG. 2(d)), the movement of the support pin 2 and the moving member 9 toward the R side stops. The moving member 9 is made slidable with respect to the support pin 2, which thus can keep the restoring force of the elastic member 7 unchanged in braking from the initial state and can keep the amount of the restoration constant after the braking is released.

Figure 3:
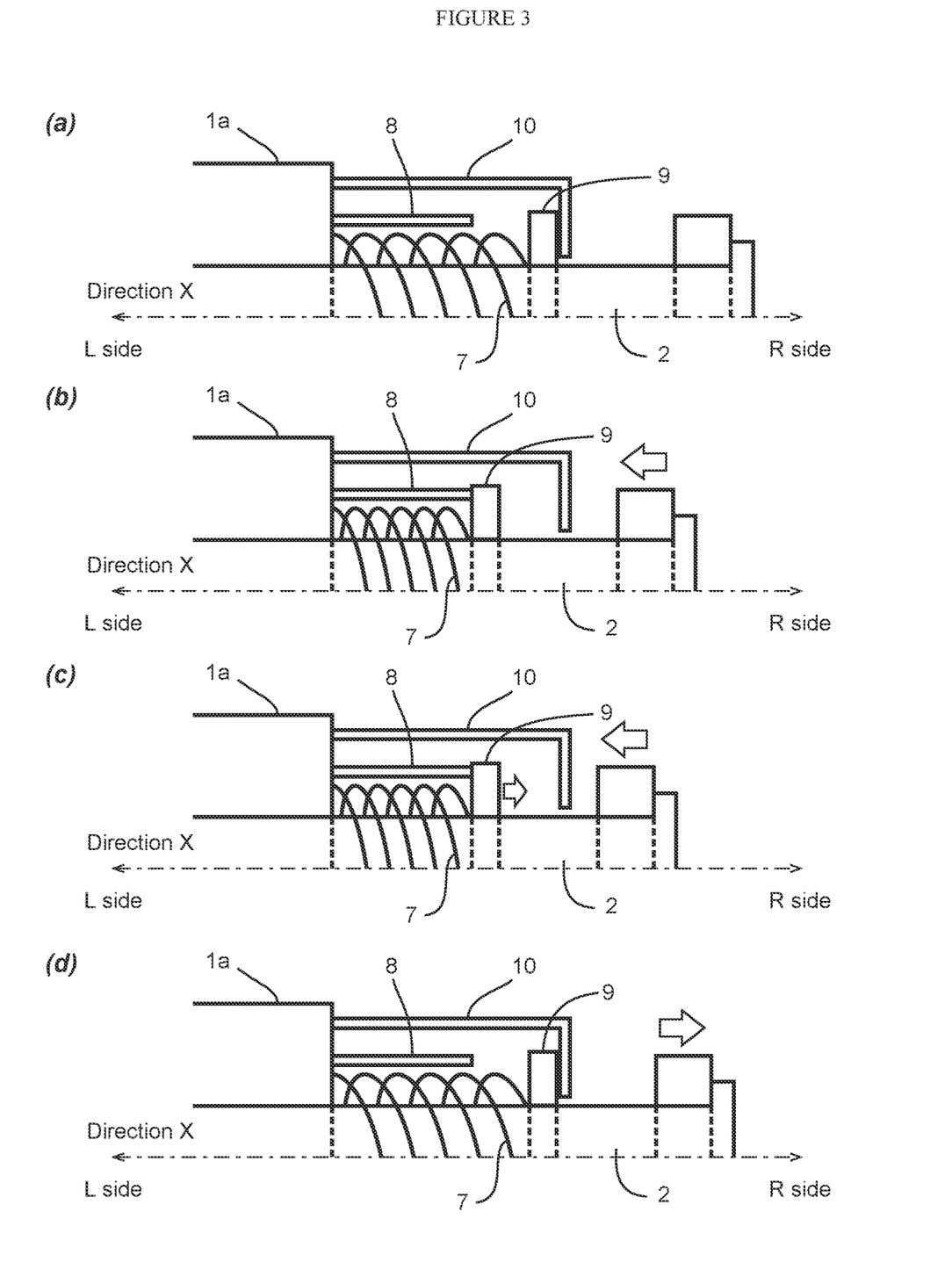
FIG. 3 is a schematic diagram illustrating the floating caliper brake device according to another embodiment of the present invention, where an elastic member, a stopper member, and a moving member, and their surroundings are enlarged.

FIG. 3 is a schematic diagram illustrating a floating caliper brake device 100 according to another embodiment of the present invention, where the elastic member 7, the stopper member 8, and the moving member 9, and their surroundings are enlarged. In the present embodiment, the floating caliper brake device 100 further includes a restriction member 10. The restriction member 10 is a member that restricts a distance between the end portion of the elastic member 7 on the L side and the end portion of the moving member 9 on the L side to not more than a predetermined value.

The inclusion of the restriction member 10 allows the members to be kept stationary even in a case where the restoring force of the elastic member 7 in the non-braking is greater than the maximum static friction occurring between the cylindrical portion 1a and the support pin 2. That is, a strong restoring force can be applied beforehand to the elastic member 7 as compared with a case of not including the restriction member 10. In addition, a stronger restoring force can be applied to the elastic member 7 in the braking. In addition, even in a case where a spring constant of the coiled spring used as the elastic member 7 somewhat changes with use, the amount of the restoration can be kept constant accurately.

Figure 4:
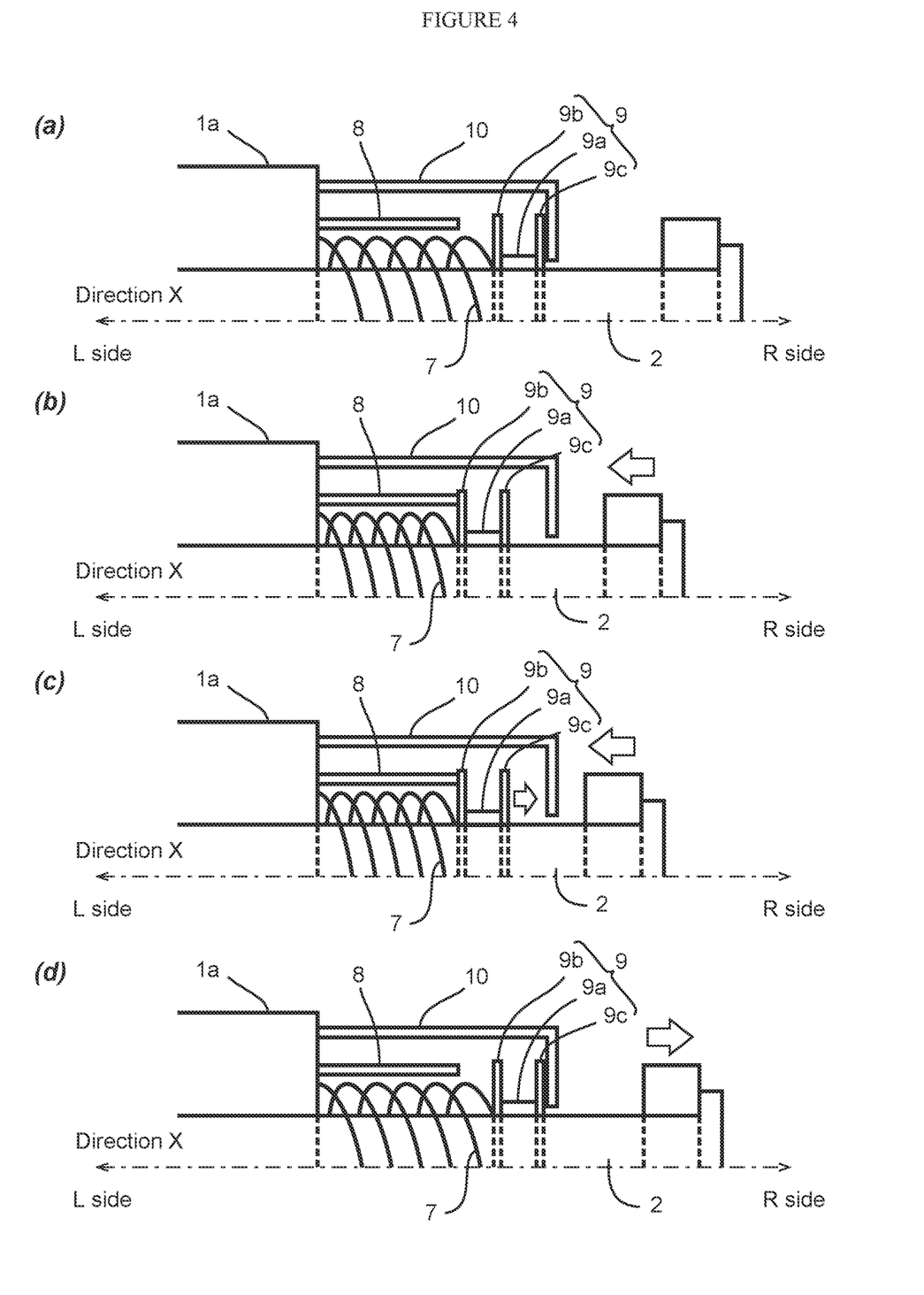
FIG. 4 is a schematic diagram illustrating the floating caliper brake device according to still another embodiment of the present invention, where an elastic member, a stopper member, and a moving member, and their surroundings are enlarged.

FIG. 4 is a schematic diagram illustrating a floating caliper brake device 100 according to still another embodiment of the present invention, where the elastic member 7, the stopper member 8, and the moving member 9, and their surroundings are enlarged. As illustrated in FIG. 4, the moving member 9 may be made up of a plurality of members including a friction member 9a to be frictionally engaged with the support pin 2, a first butting member 9b to abut against the stopper member 8, and a second butting member 9c to abut against the restriction member 10.

Furthermore, although the elastic member 7 and the stopper member 8 are supported directly by the cylindrical portion 1a in the embodiments described above but may be supported by the cylindrical portion 1a via other members.

INDUSTRIAL APPLICABILITY

According to the present invention, an amount of restoration for the caliper is adjustable, and thus gaps between the brake shoes and a rotor can be adjusted, so that the brake shoes can be prevented from being dragged.

REFERENCE SIGNS LIST 1. support frame
1a cylindrical portion
2. support pin
3. caliper
3a first arm portion
3b second arm portion
4. first brake shoe
5. second brake shoe
6. pressurizing device
7. elastic member
8. stopper member
9. moving member
9a friction member
9b first butting member
9c second butting member
10. restriction member
100. floating caliper brake device
200. floating caliper brake device
201. caliper
201a, 201b arm section
202a, 202b brake shoe
203. wheel
204. rotor
205. support frame

The invention claimed is:

1. A floating caliper brake device for a railroad vehicle, comprising:
　　a support frame that includes a cylindrical portion and is installed on a railroad bogie;
　　a support pin that is supported by the cylindrical portion in such a manner as to be slidable in an axial direction of the cylindrical portion,
　　wherein the support pin penetrates the cylindrical portion from a first side of the cylindrical portion to a second side of the cylindrical portion;
　　a caliper that extends in a direction intersecting with the axial direction, and includes a first arm portion fixed to the support pin and provided on a first side of the cylindrical portion in the axial direction and a second arm portion fixed to the support pin and provided on a second side of the cylindrical portion in the axial direction,
　　wherein the first arm portion is fixed to the support pin on the first side of the cylindrical portion and the second arm portion is fixed to the support pin on the second side of the cylindrical portion;
　　a first brake shoe that is provided on the first arm portion;
　　a second brake shoe that is provided on the second arm portion and is opposite to the first brake shoe in the axial direction;
　　a pressurizing device configured to move the first brake shoe back and forth with respect to the second brake shoe;

an elastic member that is supported by the cylindrical portion and is expandable and contractible in the axial direction;

a stopper member that is supported by the cylindrical portion in such a manner as to be immovable relatively to the cylindrical portion in the axial direction; and a moving member that is frictionally engaged with the support pin on the second side from the elastic member so as to be slidable in the axial direction, wherein an end portion of the elastic member on the first side and an end portion of the stopper member on the first side are each supported by the cylindrical portion, at least a portion of an end portion of the stopper member on the second side overlaps the moving member when viewed in the axial direction, and an end portion of the elastic member on the second side projects toward the second side from the end portion of the stopper member on the second side and is connected to the moving member.

2. The floating caliper brake device for a railroad vehicle according to claim 1, wherein the moving member is frictionally engaged with the support pin in such a manner that a maximum static friction occurring between the support pin and the moving member is greater than a restoring force of the elastic member.

3. The floating caliper brake device for a railroad vehicle according to claim 1, further comprising a restriction member configured to restrict a distance between the end portion on the first side of the elastic member and the end portion on the first side of the moving member to not more than a predetermined value.

4. The floating caliper brake device for a railroad vehicle according to claim 2, further comprising a restriction member configured to restrict a distance between the end portion on the first side of the elastic member and the end portion on the first side of the moving member to not more than a predetermined value.

* * * * *